United States Patent [19]
Bracken

[11] 3,935,579
[45] Jan. 27, 1976

[54] IDENTIFICATION CAMERA AND METHOD OF MAKING IDENTIFICATION CARDS

[75] Inventor: Thomas W. Bracken, Rochester, N.Y.

[73] Assignee: Macro Industries, Inc., Rochester, N.Y.

[22] Filed: Aug. 23, 1973

[21] Appl. No.: 390,891

[52] U.S. Cl. .............................................. 354/109
[51] Int. Cl.² ......................................... G03B 17/24
[58] Field of Search .............. 354/105, 109; 352/47

[56] References Cited
UNITED STATES PATENTS

| | | | |
|---|---|---|---|
| 3,223,007 | 12/1965 | Craven .............................. | 354/105 |
| 3,610,120 | 10/1971 | Morse ................................ | 354/109 |
| 3,634,004 | 1/1972 | Howard .............................. | 352/47 |

*Primary Examiner*—John M. Horan
*Attorney, Agent, or Firm*—Shlesinger, Fitzsimmons & Shlesinger

[57] ABSTRACT

To make an identification card, an individual is placed in front of a retroreflective screen, and faces a camera which has a semi-transparent mirror disposed at an angle of 45° in front of its principal objective lens. A card, bearing data identifying the individual, is placed in the camera in registry with a second objective lens whose axis is disposed at right angles to the axis of the principal lens and at 45° to the mirror. When the shutter between the principal lens and the photosensitive material in the camera is tripped, flash mechanisms cause the image of the card to be transmitted by the mirror to the screen and back through the principal lens onto a frame of the photosensitive material, where it forms a homogeneous background, and simultaneously cause the image of the individual to be photographed through the principal lens onto the same frame of photosensitive material.

6 Claims, 8 Drawing Figures

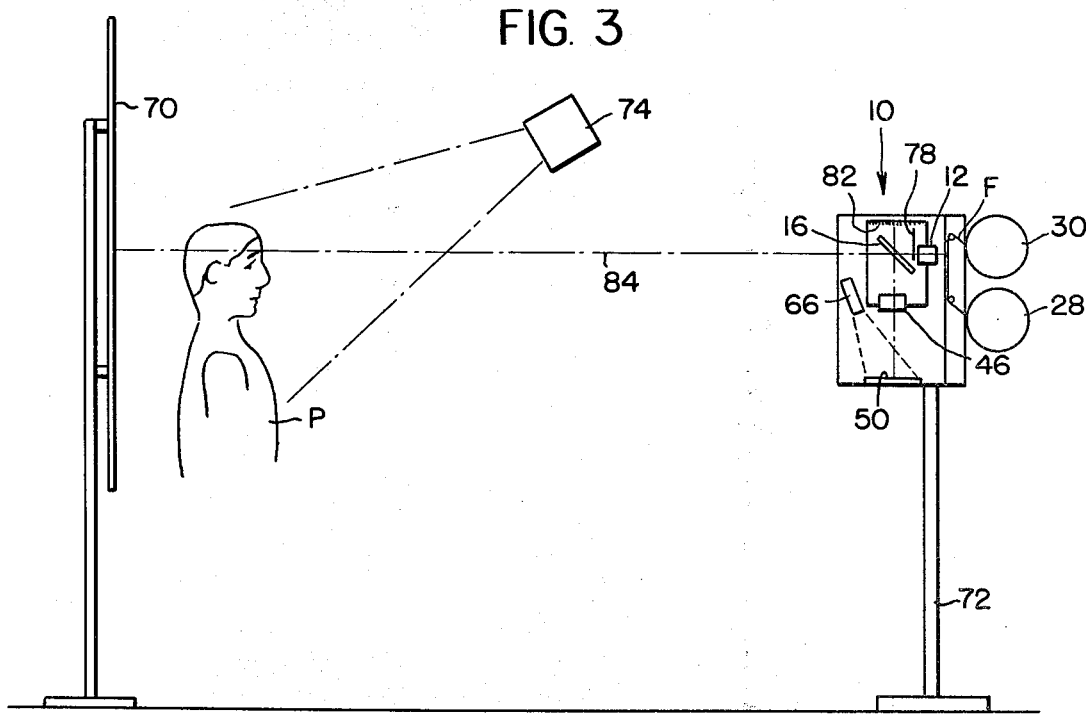
FIG. 3
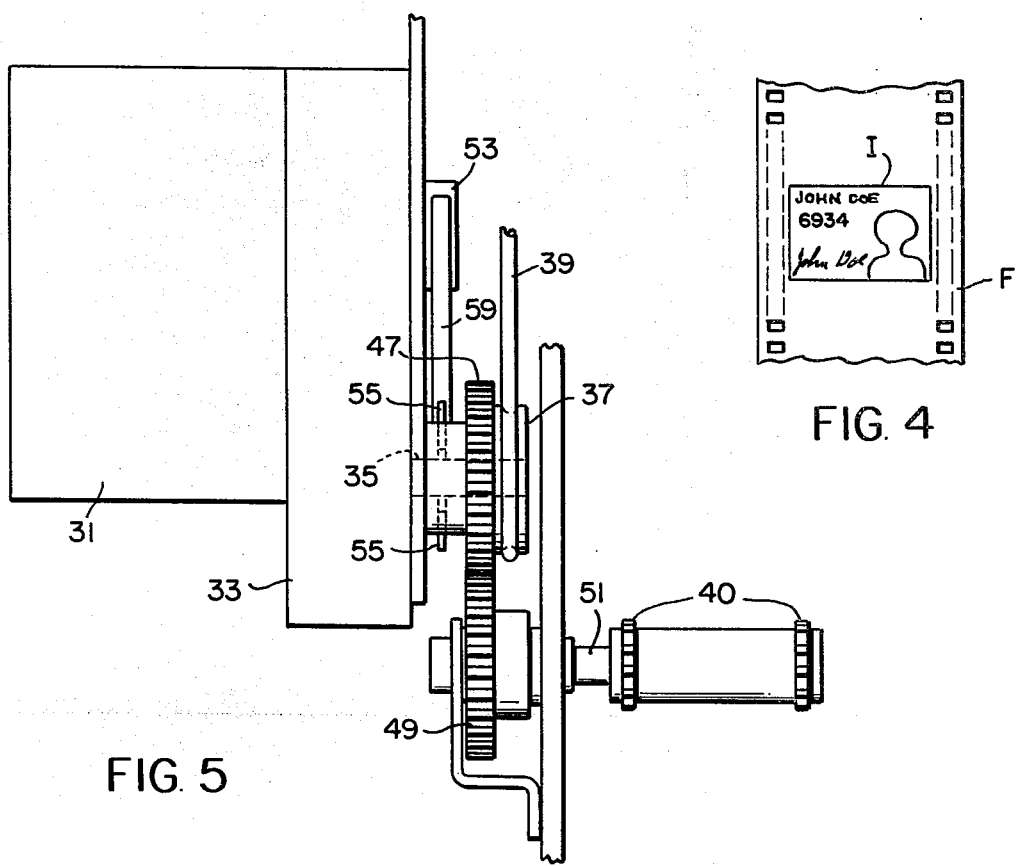
FIG. 4
FIG. 5

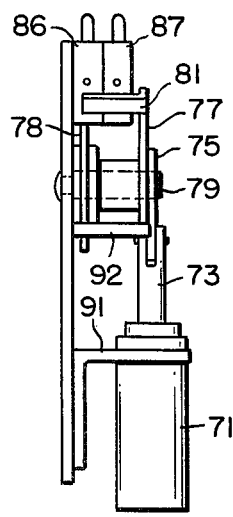
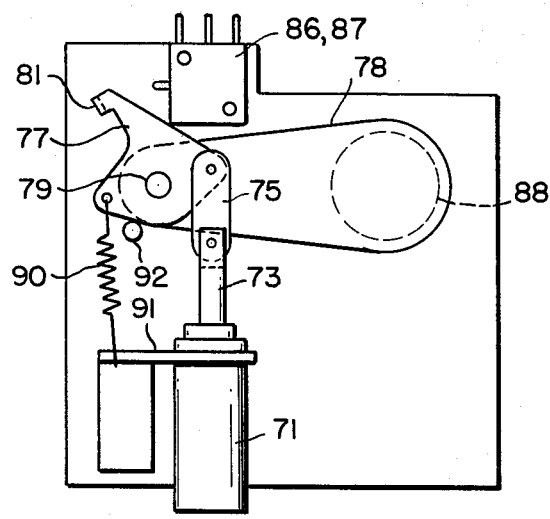
FIG. 7
FIG. 6
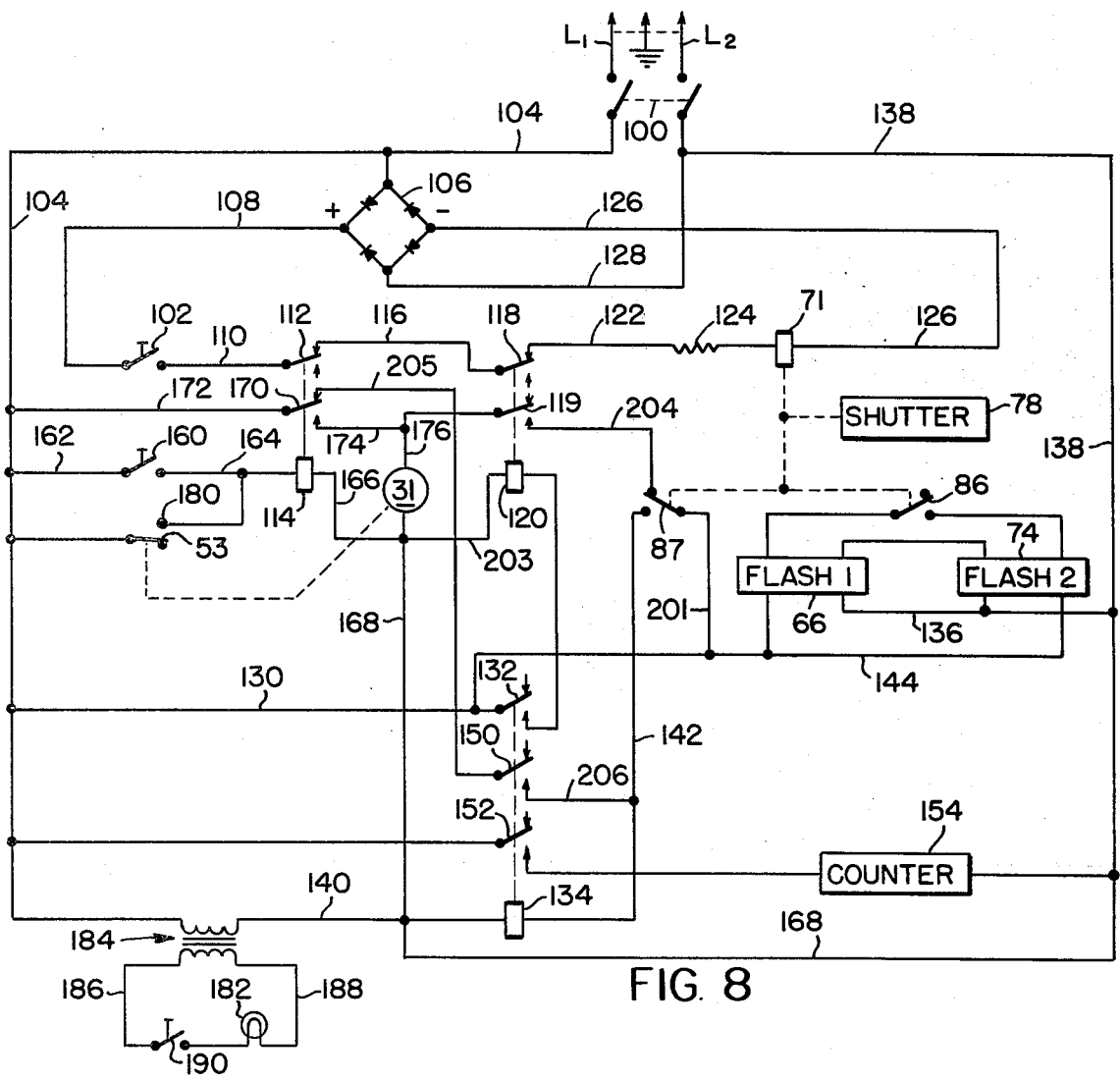
FIG. 8

IDENTIFICATION CAMERA AND METHOD OF MAKING IDENTIFICATION CARDS

This invention relates to cameras and particularly to cameras for producing identification cards, and more specifically identification cards with the picture of an individual formed on a homogeneous background comprising the image of a card having thereon his or her identifying data.

Heretofore many identification cards have been produced by gluing or photographing an individual's picture onto a blank identification card, and thereafter typing the data identifying that individual. Usually the card is signed by the individual; and in some instances encased in plastic. It has been found, however, that such cards, even those encased in plastic, can be altered; and therefore more and more there have come into use cameras for producing identification cards which will simultaneously take a picture of the individual, for whom the card is being prepared, and of data identifying that individual.

A primary object of the present invention is to provide a relatively compact camera, which is simplified in construction as compared with prior cameras for making identification cards of the latter type.

Another object of the invention is to provide a camera of the character described which can be operated rapidly so as to permit use thereof in making individual I. D. cards successively for large groups of people.

Still another object of the invention is to provide a camera of the character described which, once tripped for taking a picture, will complete its cycle of operation automatically through suitable electrical circuits and controls built into the camera.

A further object of the invention is to provide a camera of the type described which will simultaneously photograph a person and his or her data card in such manner that the image of the data card forms a homogeneous background for the image of the person.

Other objects of the invention will be apparent hereinafter from the specification and from the recital of the appended claims, particularly when read in conjunction with the accompanying drawings:

In the drawings:

FIG. 3 is a more or less diagrammatic view illustrating how the camera is used in making an identification card for an individual;

FIG. 4 is a view showing fragmentarily a strip of film on which a photograph of an individual and of data identifying that individual have been taken by this camera;

FIG. 5 is a detail view, on an enlarged scale, illustrating part of the drives to the film take-up spool and the film metering sprocket;

FIG. 6 is a detail side elevation illustrating the shutter-operated mechanism and the film advance and flash switches;

FIG. 7 is a front elevation of the parts shown in FIG. 6; and

FIG. 8 is an electrical diagram illustrating one way in which the camera may be wired to effect its operation.

Figure 1:
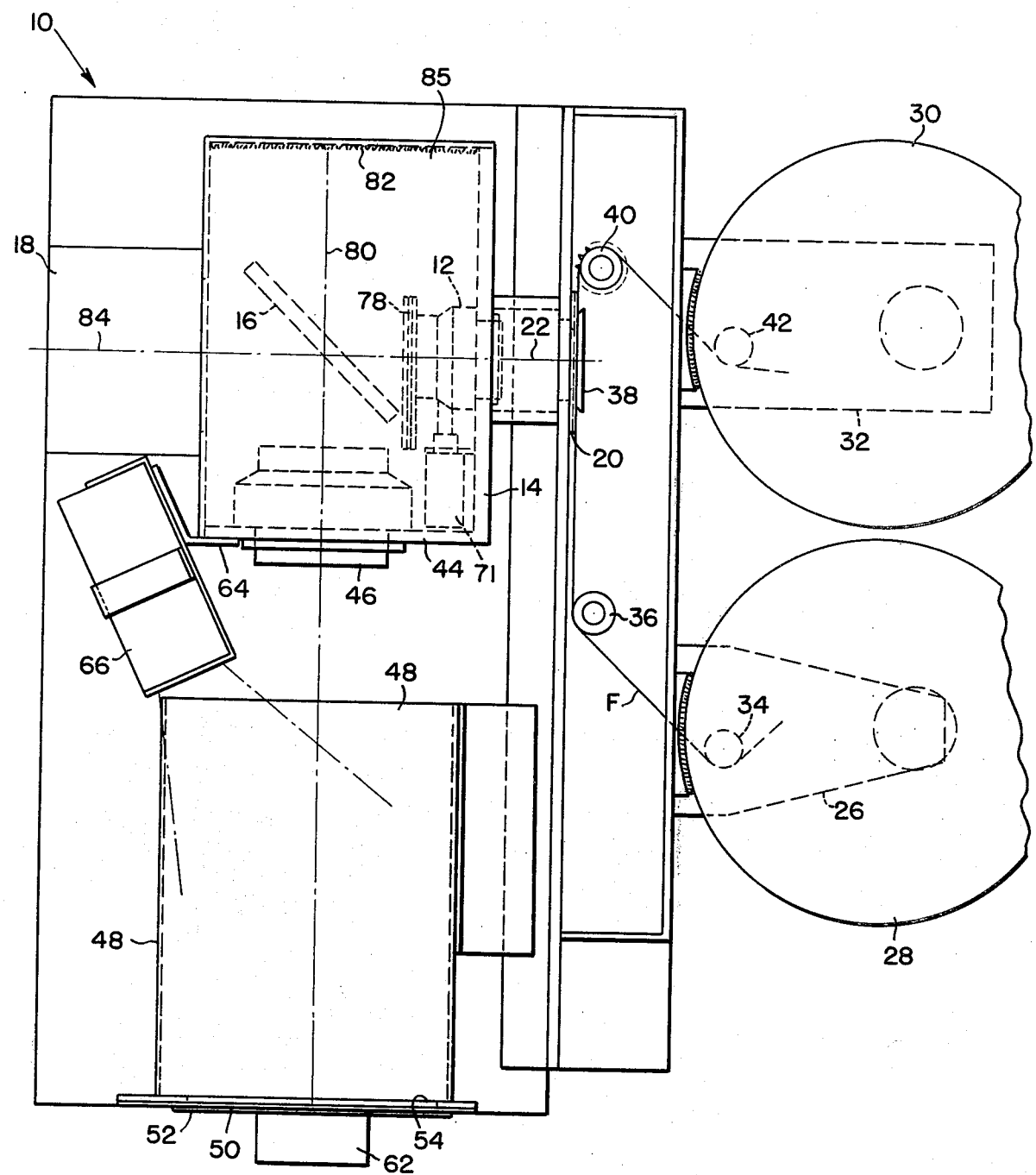
FIG. 1 is a side elevation of a camera built according to one embodiment of this invention.

Referring now to the drawings by numerals of reference, 10 denotes generally the casing of the camera having a photographic objective lens mount 12 secured in the back wall 14 of a chamber 85 of the camera so as to register with a semitransparent mirror 16, and with an opening 18 in the front of the camera. The lens also registers with an exposure aperture in the plate 20 of the camera. The mirror 16 is inclined at an angle of 45° to the axis 22 of the objective 12.

Rotatably mounted on a bracket 26 which is secured to the rear of the camera is a supply spool 28 for film. The take-up spool is denoted at 30, and is mounted on a bracket 32, which is also secured to the rear of the camera. The film is adapted to be fed from the supply spool 28 over an idler roll 34, a guide roll 36, beneath the pressure plate 38 across the exposure aperture of the camera, and around the metering sprockets 40 and idler roll 42 to the take-up spool 30. The pressure plate 38 is resilient and may be of conventional construction. It is secured in the camera to hold a frame of film in the exposure plane of the camera.

Figure 2:
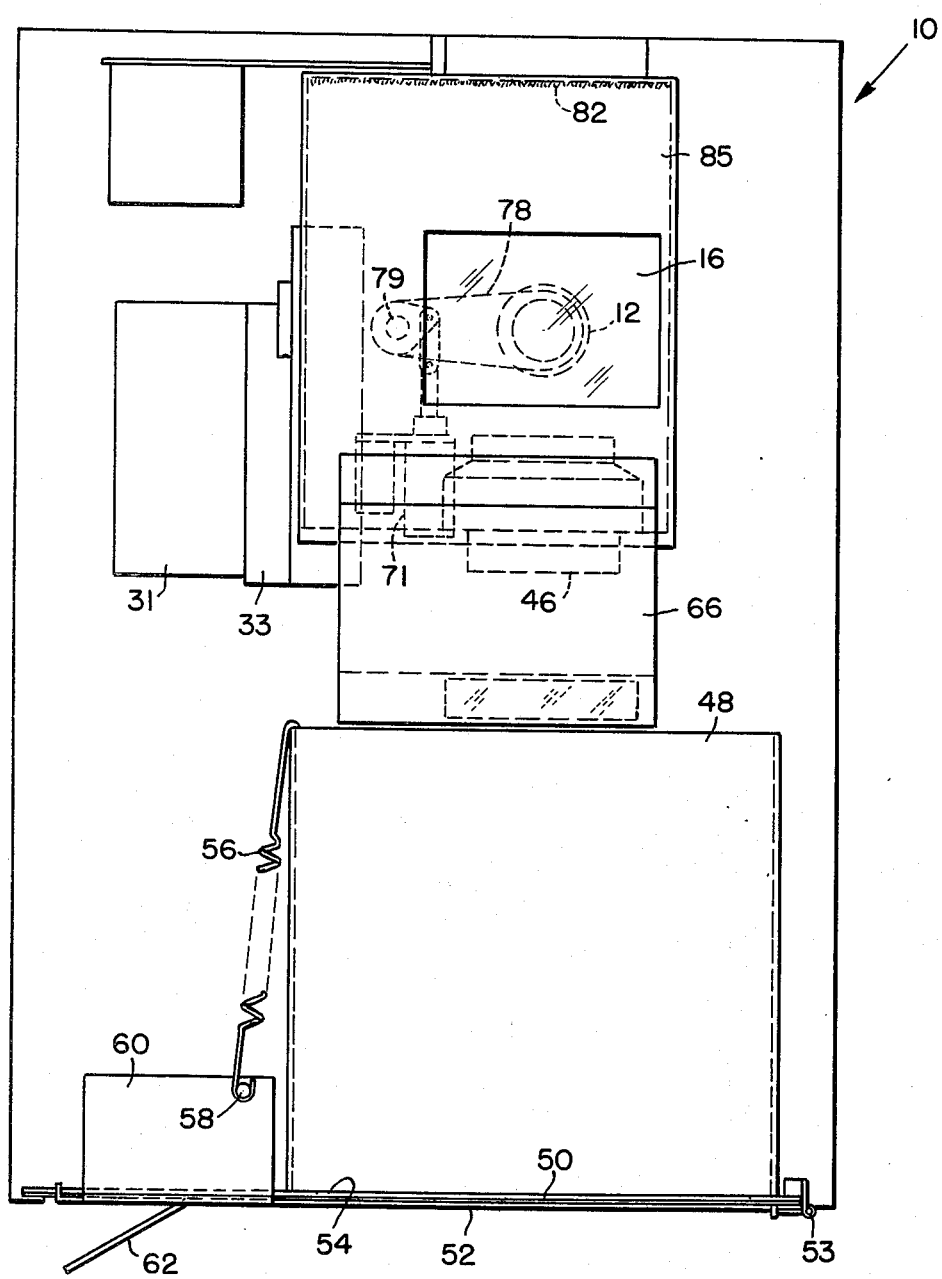
FIG. 2 is a front view of this camera.

The take-up spool is driven from the motor 31 (FIGS. 2 and 5), which is mounted at one side of the camera casing, through a conventional gear reduction (not shown) in gear box 33, a shaft 35, a pulley 37 fastened to drive shaft 35, a spring belt 39, and a pulley (not shown) secured to the shaft of take-up spool 30.

Shaft 35 also drives metering sprockets 40 (FIG. 5) through gears 47 and 49, the latter of which is secured to shaft 51 to which the sprockets 45 are keyed or otherwise secured. There are two coaxial sprockets 40 which engage in the notches or perforations adjacent the two lateral edges of the film.

Mounted in the lower wall 44 of the lens chamber 85 is a data card objective lens 46 (FIG. 1). This faces the data card illumination box 48.

When an individual is to be photographed, the data card 50 (FIGS. 1 and 2) identifying that individual is inserted face up in the data card door 52 which is hinged at 53 to the bottom of the camera in registry with the data card aperture 54 in the bottom of the illumination box 48.

The door 52 is held closed by a coil spring 56 (FIG. 2), one end of which is hooked over a pin 58 that is secured in an ear 60 integral with the door at one side thereof, and the other end of which is hooked over the top of the illumination box 48. A down turned tab 62 integral with the door makes it possible readily to open the door manually to insert a data card between guides formed at opposite sides of the door, or to remove a data card therefrom.

Mounted on a bracket 64, which is secured to the bottom of the chamber 85, is an electronic flash tube 66, which is so disposed as to shine down into the illumination box 48.

The illumination box 48 is made of a highly reflective material, or lined with such a material, so that when the flash 66 is actuated it will evenly illuminate the data card in the door 52.

The camera is adapted to be used in conjunction with a retro-reflecting screen 70 (FIG. 3), in front of which the person, whose I. D. card is to be made, stands. The camera is supported on a stand or post 72. An electronic flash unit 74 is mounted in the room, where the I. D. card is being made, so as to illuminate the subject P, but be out of the way of the camera lens 12. The relative positions of the camera, the subject P, the subject flash unit 74, and the retro-reflecting screen 70 are shown in FIG. 3.

A shutter 78 (FIGS. 2, 6 and 7), that is pivotally mounted on shaft 79 in chamber 85 ordinarily covers the opening 88 of lens 12. This shutter is adapted to be operated by a solenoid 71 through an armature or plunger 73, and a link 75 which is pivotally connected at one end to plunger 73 and is pivotally connected at its opposite end to a lever 77 that is secured to the same shaft 79 as shutter 78. A spring 90, which is secured at one end to lever 77 and at its opposite end to the bracket 91, that carries the solenoid 71, constantly urges the shutter 78 to closed position. Lever 77 has a ledge 81 on it that trips the switch 86, which controls the flash lamps 66 (FIG. 1) and 74 (FIG. 3), so that when the shutter is opened, the person, whose identification card is being made, and the data card relating to that person, are simultaneously illuminated.

When the switch for operating the camera is depressed, the shutter solenoid 71 pulls the shutter blade 78 from in front of the camera lens 12; and when the shutter is fully open, it trips the switches that fire the data card electronic flash unit 66 and the person illuminator 74. The unit 66 illuminates the data card 50 to project the image of the strongly illuminated data card to the beam splitter, or semi-transparent mirror 16.

This mirror passes fifty percent of the image on the optical path 80 (FIG. 1) to the light absorbing plush 82 which is secured on the inside of the upper wall of the lens chamber 85, where it is lost. The remaining fifty percent of the image is reflected out of the camera by the beam splitter along the optical path 84 to the retro-reflecting screen 70 (FIG. 3). This screen is an optical component consisting of a multitude of minute spherical glass elements set in a matrix. These spherical balls reflect light incident upon them back along the exact path by which the light entered.

The data card projection lens 46 is focused to project a sharp image of the data card on the retro-reflecting screen 70 from which the image is reflected back along the optical path 84 to the camera. When the image returns to the beam splitter 16 fifty percent is reflected through the projection lens 46 back to the card 54 and lost. The remaining fifty percent passes through the beam splitter to the camera lens 12 which is focused to place a sharp image of the screen 70 onto the film F. Thus, both the image of the data card and of the person standing in front of the screen 70 are photographed simultaneously on the film F.

One way in which the camera may be wired to effect its operation is shown in FIG. 8.

Power is supplied to the camera from any suitable source of alternating current through lines $L_1$ and $L_2$. When the double blade switch 100 is closed, a rectifier 106 is energized from lines 104 and 126 to produce positive and negative DC potentials on lines 108 and 126, respectively. Nothing further happens, however, until the operating switch 102 is closed.

When the switch 102 is closed to take a picture, DC current flows from line 108, switch 102, line 110, arm 112 of relay 114, line 116, arm 118 of relay 120, line 122, resistance 124, shutter solenoid 71, and line 126 to the ground or negative side of rectifier 106. The thus - energized solenoid 71 opens the shutter 78 and causes the lever 77 (FIGS. 6 and 7) to close the switches 86 and 87. Switch 86 completes a triggering circuit which actuates the flash units 66 (FIG. 1) and 74 (FIG. 3) to expose the film and take pictures thereon of the person and his identifying data. The latent image I on the film F at this point is shown in FIG. 4.

The power for the flash circuit is from lines $L_1$ and 104 through line 130, line 144, the flash units 66 and 74, lines 136 and 138 to line $L_2$.

Upon the closing of switch 87 relay 134 is energized from line 104, 130, 144, 201, switch 87, line 142, relay 134, and lines 140, 168 and 138 to $L_2$. When the relay 134 is energized its relay arms 150 and 152 are closed, as well as the arm 132. Closing of arm 152 actuates a conventional counter 154 to register that one picture has been taken. The circuit to the counter is from line 104 to line 138 through relay arm 152.

Closing arm 132 energizes relay 120 from 104, 130, 132, 202, 120, 203, and 168 to 138. This opens arm 118, which removes power from the shutter solenoid 71 so that shutter 78 is closed by spring 90, and the switches 86 and 87 return to their original positions (FIG. 8).

Also at this time motor 31 is energized from 104, 130, 144, 201, 87, 204, 119, 176, and through motor 31 and line 168 to 138 to advance the film F to bring a new frame of this film into registry with the exposure aperture 20 of the camera. The motor is stopped in a conventional manner by a stop pin (not shown) mounted on a disk (not shown) which is driven by the motor, and which makes one half a revolution each time the motor is energized. When the motor starts rotating the pin closes switch arm 53. Relay 114 is then energized and opens arm 112, which prevents a second operation of the camera until the preceding cycle is complete, and moves arm 170 from line 205 to line 174. This releases the holding circuit for relay 134, thereby deenergizing relay 134, which in turn deenergizes relay 120, and keeps power to the motor 31 through switch 170.

When the motor pin (not illustrated) turns one half revolution, it opens switch arm 53, thus deenergizing relay 114 and, in turn, the motor 31. This completes the cycle and prepares the solenoid circuit for the next cycle. For film advance only, the operator of the camera closes the switch 160 manually. This energizes relay 114, which thus energizes the motor 31 with subsequent operations the same as for the automatic mode.

To accurately position the individual being photographed in relation to the information on the data card, an aiming light 182 may be pivoted on the camera. Since this aiming light will operate at a much smaller voltage than used in the rest of the camera, a transformer 184 is provided between line 140 and the aiming light. The aiming light is connected with the secondary of this transformer by line 186 and 188 and manually-operable switch 190. When the photographer wants to test his subject, he simply closes normally-open switch 190.

While the invention has been described in connection with one embodiment thereof, it will be understood that it is capable of further modification and this application is intended to cover any modifications of the invention that come within the scope of the invention or the limits of the appended claims.

Having thus described my invention, what I claim is:

1. A camera for exposing photosensitive material for identification cards and the like containing a photograph of an individual and data relating to that individual, comprising a casing having an aperture in its front wall, and a data card opening in another of its walls, means for holding photosensitive material in said casing, and in registry with said aperture, a first lens mounted in said casing in front of said holding means with its optical axis aligned with the center of said aperture, a shutter movably mounted in front of said lens for movement between closed and open positions so that when said shutter is open, light from outside said casing may pass through said aperture and onto the photosensitive material, an opaque cover mounted on said casing for movement into and out of a closed position over said data card opening, means on said cover for removably holding over said opening in said casing, when said cover is closed, a data card containing data relating to an individual, means for illuminating said data card, a second lens disposed with its optical axis in the same plane as the optical axis of the first lens and optically aligned with said data card opening and with a data card held therein by said cover, and a beam splitter disposed in said casing in operative relation to both said lenses and located in alignment with said aperture, and in front of said shutter, to reflect part only of the light from the illuminated data card out of said casing along the optical axis of said first lens, and operative to transmit through said first lens and onto said photosensitive material, when said shutter is open, only part of the light entering said casing through said aperture.

2. A camera as claimed in claim 1, wherein said lenses have their axes at right angles to one another, and said beam splitter is a semi-transparent mirror and is disposed at an angle of 45° to the axes of both lenses.

3. A camera as defined in claim 1, wherein said cover is hingedly connected along one edge thereof to said casing for pivotal movement between its open and closed positions, and resilient means is interposed between said casing and said cover resiliently to urge said cover to its closed position.

4. Apparatus for making identification cards, comprising a retro-reflective screen in front of which an individual whose card it to be made, is placed, a camera having an aperture in its front wall and having a first lens disposed in optical registry with said aperture and with photosensitive material in the camera, means for holding in the camera a card bearing data identifying the individual, a shutter pivotally mounted between said first lens and said aperture for pivotal movement about a first axis between open and closed positions, means actuatable for illuminating a card held in said holding means, an actuator connected to said shutter and pivotal therewith about said first axis to an operative position in which it actuates said card illuminating means, when said shutter is in its open-position, a second lens in said camera for projecting an image of said card along a second axis which intersects the optical axis of said first lens, and means for directing the image of the illuminated card from said second lens through said aperture and toward said screen for reflection thereby back into the camera through said aperture, said directing means being operative, when said shutter is open, to admit through said first lens and onto said photosensitive material, both the reflected image of said card and the image of the individual in front of said screen thereby to photograph the card and the individual simultaneously.

5. Apparatus as claimed in claim 4, comprising auxiliary means for illuminating the individual whose card is being made, means for simultaneously energizing said card illuminating means and said auxiliary illuminating means, wherein said screen comprises a multitude of spherical glass elements set in a matrix disposed in a plane transverse to the optical axis of said first lens, and said means for directing the image of said card onto said screen comprises a beam splitter disposed in said camera in front of said first lens and said shutter and in registry with said second lens to direct part of the light from the illuminated card onto said screen to be reflected thereby, and to allow a portion of the light reflected fron said screen and from said individual to pass back through said first lens onto said material.

6. Apparatus for making identification cards as defined in claim 4, including a shaft mounted for oscillation coaxially about said first axis, said shutter and said actuator being fixed to said shaft for pivotal movement thereby about said first axis, resilient means normally urging said shaft to a first position in which said shutter is disposed in its closed position, and said actuator is disposed in an inoperative position relative to said card illuminating means, and a solenoid operatively connected to said shaft, and operative when energized, to pivot said shaft to a second position simultaneously to swing said shutter to its open position, and to swing said actuator to its operative position.

* * * * *